(12) United States Patent
Kweon et al.

(10) Patent No.: US 9,925,752 B2
(45) Date of Patent: Mar. 27, 2018

(54) METHOD FOR MANUFACTURING SYNTHETIC LEATHER USING DIFFERENT LIQUID SILICONE RUBBER COATING SOLUTIONS

(75) Inventors: Dowan Kweon, Busan (KR); Choongryeol Park, Busan (KR); Heeun Byun, Busan (KR)

(73) Assignee: JEONGSAN INTERNATIONAL CO., LTD, Busan (KR)

( * ) Notice: Subject to any disclaimer, the term of this patent is extended or adjusted under 35 U.S.C. 154(b) by 1033 days.

(21) Appl. No.: 14/124,521

(22) PCT Filed: Jul. 30, 2012

(86) PCT No.: PCT/KR2012/006049
§ 371 (c)(1),
(2), (4) Date: Dec. 6, 2013

(87) PCT Pub. No.: WO2014/014152
PCT Pub. Date: Jan. 23, 2014

(65) Prior Publication Data
US 2015/0165745 A1    Jun. 18, 2015

(30) Foreign Application Priority Data
Jul. 19, 2012 (KR) .................. 10-2012-0078587

(51) Int. Cl.
| | | |
|---|---|---|
| *B32B 37/15* | (2006.01) | |
| *B32B 38/10* | (2006.01) | |
| *B32B 25/10* | (2006.01) | |
| *B32B 25/20* | (2006.01) | |
| *D06N 3/12* | (2006.01) | |
| *B32B 5/02* | (2006.01) | |
| *B32B 25/04* | (2006.01) | |
| *B32B 37/26* | (2006.01) | |
| *D04H 1/587* | (2012.01) | |
| *D04H 1/64* | (2012.01) | |

(52) U.S. Cl.
CPC .............. *B32B 37/15* (2013.01); *B32B 5/024* (2013.01); *B32B 25/042* (2013.01); *B32B 25/10* (2013.01); *B32B 25/20* (2013.01); *B32B 37/26* (2013.01); *B32B 38/10* (2013.01); *D04H 1/587* (2013.01); *D04H 1/64* (2013.01); *D06N 3/128* (2013.01); *B32B 2037/268* (2013.01); *B32B 2250/03* (2013.01); *B32B 2262/0269* (2013.01); *B32B 2479/00* (2013.01); *B32B 2605/003* (2013.01); *D06N 2209/067* (2013.01); *D06N 2209/143* (2013.01); *D06N 2209/146* (2013.01); *D06N 2211/28* (2013.01); *Y10T 442/2041* (2015.04)

(58) Field of Classification Search
None
See application file for complete search history.

(56) References Cited

U.S. PATENT DOCUMENTS

2007/0231573 A1* 10/2007 Thatcher .................. D02G 3/36
428/375

FOREIGN PATENT DOCUMENTS

| DE | 29812075 | * | 9/1998 |
| DE | 60131060 | * | 7/2008 |
| JP | 2005-120485 | | 5/2005 |
| JP | 2010228413 | * | 10/2010 |
| KR | 920007105 | * | 8/1992 |

OTHER PUBLICATIONS

Machine translation of DE60131060, Yoneda et al.*
Machine translation of JP2010228413, Kogo et al.*
Machine translation of KR920007105 Shin et al.*
Machine translation of DE29812075 Schaefer.*
Japan Patent Office Application Serial No. 2014-525918, Office Action dated Aug. 5, 2014, 2 pages.

* cited by examiner

*Primary Examiner* — Shawn Mckinnon
*Assistant Examiner* — Lawshawnda T McKinnon
(74) *Attorney, Agent, or Firm* — Lee, Hong, Degerman, Kang & Waimey

(57) ABSTRACT

The present invention relates to a method for manufacturing synthetic leather for various interior materials and various miscellaneous goods using liquid silicone rubber coating solutions, and particularly, to a method for manufacturing synthetic leather having physical properties optimized so as to be suitable for a use using a different textile according to the use thereof.

5 Claims, No Drawings

METHOD FOR MANUFACTURING SYNTHETIC LEATHER USING DIFFERENT LIQUID SILICONE RUBBER COATING SOLUTIONS

CROSS-REFERENCE TO RELATED APPLICATIONS

This application is the National Stage filing under 35 U.S.C. 371 of International Application No. PCT/KR2012/006049, filed on Jul. 30, 2012, which claims the benefit of earlier filing date and right of priority to Korean Patent Application No. 10-2012-0078587, filed on Jul. 19, 2012, the contents of which are all hereby incorporated by reference herein in their entirety.

TECHNICAL FIELD

The present invention relates to a method for manufacturing synthetic leather for interior materials and various miscellaneous goods, particularly, to a method for manufacturing synthetic leather using different liquid silicone rubber coating solutions, and more particularly, to a method for manufacturing synthetic leather having physical properties optimized so as to be suitable for a use using a different textile according to the use thereof, and synthetic leather manufactured thereby.

BACKGROUND ART

According to the related art, as a coating material at the time of manufacturing synthetic leather, polyurethane or polyvinylchloride (PVC) have been mainly used. In a method for manufacturing synthetic leather using polyurethane, synthetic leather is manufactured using a polyurethane impregnation material containing 20 to 80 parts by weight of a solid component formed by polymerizing polyol, a chain extender, isocyanate, and the like in a presence of an organic solvent such as dimethylformamide, methylethylketone, or the like, and having a viscosity of 50,000 to 150,000 cps/25° C. and a coating material. This method is generally divided into a dry method and a wet method.

In the dry method, polyurethane is used as a coating layer and an adhesive layer, and a film is formed by coating a coating solution in which polyurethane, dimethylformamide, methylethylketone, and a pigment are mixed with each other at a suitable ratio on a release paper at least one time and passing the release paper through a drier to volatilize the solvent. In addition, after coating the film again with a coating solution in which a polyurethane adhesive, a curing agent, a curing accelerator, dimethylformamide, and methylethylketone are mixed with each other at a suitable ratio, a textile is adhered thereto using an adhesive and sufficiently cured, and then, the release paper is peeled off, thereby manufacturing a polyurethane synthetic leather.

However, in the case of the synthetic leather manufactured as described above, a working environment problem due to usage of the organic solvent and an environmental problem due to the organic solvent remaining in a final synthetic leather product have been generated.

Therefore, recently, a method for manufacturing synthetic leather using a water dispersion polyurethane that does not contain an organic solvent has been studied and developed, but there is difficulty in a manufacturing process such as processability, or the like, economical efficiency for commercialization may be insufficient, and this method does not satisfy various and improved physical properties as the synthetic leather, such that it is difficult to commercialize this method.

Therefore, the present applicant studied a method for manufacturing synthetic leather using liquid silicone rubber (LSR) in order to solve the existing environmental problems and satisfy the improved physical properties required as synthetic leather (Korean Patent Laid-Open Publication No. 2003-0095872), but in the case of the synthetic leather manufactured by this method, there was disadvantages to be described below in using this synthetic leather in various uses such as an interior material, miscellaneous goods, or the like.

First, in the case of synthetic leather to be used as an interior material of an aircraft or ship, very strict physical properties are required (for example of mainly required physical properties, there are vertical flame retardancy, smoke density, a heat release amount, and the like), but the existing method did not satisfy the above-mentioned physical properties.

Second, in the case of synthetic leather for furniture, an interior material of a vehicle, or various miscellaneous goods, a suitable adhesion strength in order to allow a coating layer not to be peeled off at the time of usage and various properties such as flame retardancy, heat resistance, contamination resistance, solvent resistance, hydrolysis resistance, and the like, are required, but the existing method did not satisfy the above-mentioned physical properties.

DISCLOSURE

Technical Problem

An object of the present invention is to provide synthetic leather capable of being stable against a temperature change and having excellent physical properties such as solvent resistance, hydrolysis resistance, contamination resistance, and the like, to satisfy physical properties required as an interior material of an aircraft by developing a base textile suitable for the interior material of the aircraft or ship and then performing a surface coating process on a surface using addition-type silicone rubber in order to manufacture synthetic leather suitable for the interior material of the aircraft or ship.

Another object of the present invention is to provide synthetic leather capable of having excellent adhesion strength and various physical properties such as contamination resistance, flame retardancy, light resistance, hydrolysis resistance, heat resistance, and the like, to satisfy physical properties required as an interior material of furniture and vehicle and miscellaneous goods by using a micro fiber non-woven fabric as a base material and performing surface coating on a skin using an addition type silicone in order to manufacture synthetic leather suitable for the interior material of furniture and vehicle and various miscellaneous goods.

Technical Solution

According to an exemplary embodiment of the present invention, there is provided a method for manufacturing synthetic leather using different liquid silicone rubber (LSR) coating solutions, the method including: performing primary coating on release paper using a first coating solution containing a first liquid silicone rubber (LSR) having a shore hardness (shore A) of 50 or more and an elongation less than 300%; performing secondary coating on the release paper coated with the first coating solution using a second coating solution containing a second liquid silicone rubber (LSR) having a shore hardness (shore A) less than 50 and an elongation 300% or more; uniting the release paper coated with the second coating solution with a textile and drying the united textile; and separating the release paper from the textile united with the release paper.

The method may further include, after the separating of the release paper, surface treating a surface from which the release paper is separated using a silicone surface coating agent.

The textile may be woven using a spun yarn made of at least one fiber selected from a group consisting of aramid fiber, oxidized pan fiber (OPF), and shrinkage fiber, and the synthetic leather may be used as an interior material of an aircraft or a ship.

The textile may be woven using polyester fiber, and the synthetic leather may be used as an interior material of a vehicle or furniture or used for miscellaneous goods.

The textile may be woven using a sea-island type fiber non-woven fabric composed of polyester and nylon, and the synthetic leather may be used as an interior material of a vehicle or furniture or used for miscellaneous goods. In the textile woven using the sea-island type fiber non-woven fabric, the number of piles of an island component may be 150 to 200 ea/mm$^2$, and a cross-sectional area may be 200 to 400 μm$^2$.

According to another embodiment of the present invention, there is provided a synthetic leather having a structure in which a first coating layer containing a first liquid silicone rubber (LSR) having a shore hardness (shore A) of 50 or more and an elongation less than 300% is laminated on a textile by a second coating layer containing a second liquid silicone rubber (LSR) having a shore hardness (shore A) less than 50 and an elongation 300% or more.

Details of embodiments will be described below with reference to the accompanying drawings.

Advantageous Effects

According to the present invention, synthetic leather having physical properties optimized so as to be suitable for a use using a different textile according to the use may be manufactured. For example, synthetic leather having excellent vertical flame resistance, smoke density, a heat release amount, or the like, to thereby satisfy standards for an interior material for an aircraft or ship may be manufactured by coating different liquid silicone rubber on a textile using a yarn made of aramid fiber, oxidized pan fiber (OPF), or the like, and synthetic leather having excellent flame retardancy, heat resistance, contamination resistance, solvent resistance, hydrolysis resistance, and the like, to thereby be optimally suitable for various interior materials for a vehicle, or the like, and miscellaneous goods may be manufactured by coating different liquid silicone rubber on a micro fiber non-woven fabric used as a base material.

BEST MODE

The present invention may be variously modified and have various types, and specific embodiments of the present invention will be described in detail with reference to the accompanying drawing. However, the present invention is not limited to the exemplary embodiments described herein, but all of the modifications, equivalents, and substitutions within the spirit and scope of the present invention are also included in the present invention. Further, when it is determined that the detailed description of the known art related to the present invention may obscure the gist of the present invention, the detailed description thereof will be omitted.

Terms used in the present specification are used in order to describe specific exemplary embodiments rather than limiting the present invention. Singular forms used in the specification are intended to include plural forms unless the context clearly indicates otherwise. Terms such as"include", "have", and the like, used in the present specification will imply the existence of stated features, numbers, steps, operations, configuration elements, components, or a combination thereof, but do not exclude other features, numbers, steps, operations, configuration elements, components, or a combination thereof.

Terms used in the specification, 'first', 'second', etc. can be used to describe various components, but the components are not to be construed as being limited to the terms. The terms are used to distinguish one component from another component.

The present invention basically relates to a method for manufacturing synthetic leather and uses a liquid silicone rubber (LSR) coating solution. A method for manufacturing synthetic leather using liquid silicone rubber (LSR) is already present, but in the method for manufacturing synthetic leather according to the present invention, particularly, a coating layer is formed at least two times using first and second liquid silicone rubber (LSR) coating solutions that are different from each other.

That is, the present invention relates to a method for manufacturing synthetic leather by primarily coating release paper using a first coating solution containing first liquid silicone rubber (LSR), subsequently secondarily coating the release paper coated with the first coating solution using a second coating solution containing second liquid silicone rubber, uniting the release paper coated with the second coating solution and a textile with each other, drying the united textile, and then separating the release paper from the united textile.

More specifically, a release paper coating process of preparing a first coating solution containing various additives for reinforcing flame retardancy as well as an addition type first liquid silicone rubber, performing primary coating on the release paper with the coating solution, and curing and drying the release paper, a binder coating process of performing secondary coating thereon with an addition type second liquid silicone rubber used as an adhesive, a textile uniting process of uniting the release paper coated with the first and second liquid silicone rubber and various textiles with each other and curing and drying the united textile, and a separating process of separating the release paper from the united textile are conducted. After the separating process, a process of surface treating a surface from which the release paper is separated using a silicone surface coating material may be further conducted.

In addition, the present invention is characterized in that as the first liquid silicone rubber, liquid silicone rubber having shore hardness (shore A) of 50 or more and an elongation less than 300% is used, and as the second liquid silicone rubber, liquid silicone rubber having shore hardness less than 50 and an elongation of 300% or more is used.

In the present invention, liquid silicone rubber in which a vinyl functional group and a methyl hydrogen group are cured by an addition curing reaction in a presence of a platinum catalyst is used. In addition, in order to further improve a heat resistance property and a flame retardancy property of the liquid silicone rubber as described above, it is preferable that alumina hydrate, titanium dioxide, silica, or the like, are added to prepare a coating solution, and then this coating solution is used.

The liquid silicone rubber used in the present invention may be composed of an A part and a B part as shown in the following Table 1, and two parts may be mixed with each other with similar contents to each other. Further, the A and B parts may be mixed with different contents and at the same time a content of a curing agent may be adjusted. Even in the case of adjusting a mixing ratio, basic addition reaction patterns are equal, and in order to improve processability, 10 to 300 parts by weight of a diluent according to the properties of a final product may be added based on 100 parts by weight of the liquid silicone rubber. Preferably, main components and content ratio of the coating solution according to the present invention may be in a range shown in the following Table 1.

TABLE 1

| Classification | Component | wt % |
|---|---|---|
| Part A | Dimethyl siloxane, dimethylvinyl-terminated | 30~60 |
| | Alumina hydrate | 30~60 |
| | Trimethylated silica | <10 |
| | Dimethylvinylated and trimethylated silica | <10 |
| | Platinum Catalyst | <1 |
| Part B | Dimethyl siloxane, dimethylvinyl-terminated | 30~60 |
| | Dimethyl, methylhydrogen siloxane | 30~60 |
| | Alumina hydrate | <10 |
| | Trimethylated silica | <10 |
| | Dimethylvinylated and trimethylated silica | <1 |

Particularly, since an object of the present invention is to provide a synthetic leather product used as an interior material of an aircraft, an interior material of a furniture, and an interior material of a vehicle and a synthetic leather product for a bag, miscellaneous goods, or the like, it is important to select silicone rubber having suitable properties.

In consideration of a textile base material to be applied or mechanical and sensitive properties of a final product, silicone rubber used as a coating layer of the synthetic leather may be differently applied. The present inventors confirmed that in the case of using liquid silicone rubber having high hardness and a low elongation as the first liquid silicone rubber forming a primary coating layer on the release paper and using liquid silicone rubber having low hardness and a high elongation as the second liquid silicone rubber forming a secondary coating layer on the primary coating layer, the synthetic leather had excellent physical property, thereby completing the present invention.

For example, as shown in the following Table 2, it is preferable that as the first coating solution, one or a mixture of at least two of a S1-1 type silicone rubber having excellent hardness and tearing strength, a S1-2 type silicone rubber and a S1-3 type silicone rubber that have a relatively excellent elongation property is used, and as the second coating solution, one or a mixture of at least two of S2-1 type and S2-2 type silicone rubber having high elongation properties is used.

TABLE 2

| Kind of silicon | Shore hardness (Shore A) | Tensile strength (Mpa) | Tearing strength (kN/m) | Elongation (%) |
|---|---|---|---|---|
| S1-1 | 74 | 10 | 38 | 22 |
| S1-2 | 68 | 7.1 | 13.6 | 144 |
| S1-3 | 67 | 7.84 | 6.5 | 90 |
| S2-1 | 10 | 6.5 | 12.5 | 800 |
| S2-2 | 30 | 8 | 13 | 600 |

Therefore, the present invention is characterized in that as the first liquid silicone rubber, a liquid silicone rubber having shore hardness of 50 or more and elongation less than 300% is used, and as the second liquid silicone rubber, a liquid silicone rubber having shore hardness less than 50 and elongation of 300% or more is used. It is preferable that as the first liquid silicone rubber, a liquid silicone rubber having shore hardness of 60 or more and elongation less than 200% is used, and as the second liquid silicone rubber, a liquid silicone rubber having shore hardness less than 40 and elongation of 400% or more is used. It is more preferable that as the first liquid silicone rubber, a liquid silicone rubber having shore hardness of 65 or more and elongation less than 150% is used, and as the second liquid silicone rubber, a liquid silicone rubber having shore hardness less than 35 and elongation of 500% or more is used.

In the case of manufacturing the synthetic leather using different liquid silicone rubber as described above, physical properties suitable for various interior uses may be obtained according to used textile base material.

For example, in the case of coating different liquid silicone rubber on a textile using a yarn made of aramid fiber, oxidized pan fiber (OPF), or the like, synthetic leather having excellent vertical flame retardancy, smoke density, a heat release amount, and the like, to thereby satisfy standards for an interior material of an aircraft or ship may be manufactured, and in the case of coating different liquid silicone rubber on a micro fiber non-woven fabric used as a base material, synthetic leather having excellent flame retardancy, heat resistance, contamination resistance, solvent resistance, hydrolysis resistance, and the like, to thereby be optimally suitable for various interior materials for a vehicle, or the like, and miscellaneous goods may be manufactured.

Hereinafter, a method for manufacturing synthetic leather for the interior material of the aircraft or ship and a method for manufacturing synthetic leather for the interior material of vehicle, furniture, or miscellaneous goods are described in detail, respectively.

1. Method for Manufacturing Synthetic Leather for Interior Material of Aircraft or Ship In this method, in order to manufacture the synthetic leather suitable for the interior material of the aircraft or ship, as the textile, a textile woven by a spun yarn made of at least one fiber selected from a group consisting of aramid fiber, oxidized pan fiber (OPF) and shrinkage fiber is used.

(1). Preparation of Textile

In developing the interior material having ultimate capacity and excellent flame retardancy, a yarn in which an aramid (meta aramid, para aramid) fiber having a fiber length of 50 to 150 mm, the OPF fiber, and the like, were mixed at a ratio shown in the following Table 3 was used.

TABLE 3

| Fiber | wt % | Remarks |
|---|---|---|
| Meta Aramid | 0~60 | |
| Para Aramid | 0~60 | |

TABLE 3-continued

| Fiber | wt % | Remarks |
|---|---|---|
| OPF | 0~80 | |
| Shrinkage Fiber | <10 | |

A spun yarn having a fineness of 150 to 300 denier was manufactured by a general spinning process using the above-mentioned yarn, and a textile (plain weave, twill weave) or knit having a warp density of 60 to 80 and a weft density of 70 to 90 was woven using the manufactured spun yarn as a warp (2-ply yarn) and a weft (single yarn), followed by performing a general scouring process, thereby manufacturing a textile as the base material for coating.

(2). Release Paper Coating Process (Coating Process of First Coating Solution)

As a silicone rubber contained in the first coating solution, a silicone rubber having the shore hardness of 50 or more and the elongation less than 300% was used as shown in Table 2. For example, one or a mixture of the S1-1 type, S1-2 type, and S1-3 type silicone rubber may be used, and in the case of using the mixture, it is preferable that the A and B parts are mixed with each other at a predetermined ratio as shown in Table 1 to thereby prepare the first coating solution.

Here, in consideration of properties of a coating processing process (processing temperature, processing rate, and the like), a processing viscosity may be adjusted to 5,000 to 150,000 cps/25° C. by adding a diluent. The first coating solution prepared as described above may be primarily coated on release paper at a suitable coating amount (50~200 g/m$^2$), followed by curing and drying in a hot-air oven at 80 to 170° C. In the method for curing and drying the first coating solution, the higher the temperature, the faster the curing and drying, and when the curing and drying is performed at 130 to 150° C. which is preferable in that there is no influence on the release paper, and the processing rate is 8 to 10 m/min, which is most preferable in view of drying and curing the first coating solution while securing processability.

(3). Binder Coating Process (Coating Process of Second Coating Solution)

After the first coating solution is cured and dried, the second coating solution (binder) was coated on the primarily cured coating solution at a suitable coating amount (100~300 g/m$^2$). Here, as the second coating solution used at this time, a soft LSR (S2-1 type or S2-2 type) having good elongation due to relatively low hardness as compared to the first coating solution may be used. The reason is that in the case of using the LSR having good elongation at a relatively large coating amount, more sensitively excellent synthetic leather may be obtained.

In addition, it is preferable that the second coating solution is formed in a shape or method capable of increasing adhesion force between the textile base material and the first coating solution during a subsequent uniting process. To this end, it is preferable that a diluent or an application oil is minimally used in the second coating solution.

In addition the primary and secondary coating may proceed as a continuous process.

(4). Textile Uniting Process and Release Paper Separating Process

Generally, in the case of drying process using a polyurethane resin according to the related art, it is important to set a processing condition of a binder used at the time of adhering the binder with a base material, and a semi-dry method is mainly used in a dry coating adhering method using a polyurethane material. The reason is that after some (about 50%) of the organic solvent contained in a binder coating solution is volatilized, the uniting with the base material may proceed.

However, in the case of using a LSR material as in the present invention, it is impossible to use a semi-dry type adhesion processing method. Therefore, in the present invention after coating the second coating solution, the textile base material was united in a wet state, and then the second coating solution was cured and dried in a hot-air oven at 80 to 170° C. In this case, it is possible to unit the textile without using a diluent or using a significantly small amount (5% or less) of the diluent.

As described above, after the second coating solution was united with the textile and then cured and dried, the release paper was separated from the first coating solution layer, thereby making it possible to obtain synthetic leather of which a surface was coated with the LSR.

(5). Surface Treating Process

In the case of the synthetic leather from which the release paper is separated as described above, mostly, a surface layer is sticky due to characteristics of the silicone rubber. However, it is difficult to manufacture a product using the synthetic leather having an inherent sticky property of rubber.

Therefore, it is preferable that properties or touch of the surface of the synthetic leather manufactured as described above is adjusted. To this end, it is suitable that surface treatment is performed using a silicone surface treating agent containing various additives (silica, or the like).

2. Method for Manufacturing Synthetic Leather for Interior Material of Vehicle, Furniture, or Miscellaneous Goods In this method, in order to manufacture synthetic leather suitable for interior material of a vehicle, furniture, or miscellaneous goods, as the textile, a textile woven using a polyester fiber, a textile woven using a sea-island type fiber non-woven fabric composed of polyester and nylon, or a textile woven using the sea-island type fiber non-woven fabric and having piles of an island components at 150 to 250 ea/mm$^2$ and a cross-sectional area of 200 to 400 μm$^2$ was used.

That is, as the textile, the sea-island type fiber non-woven fabric was manufactured by a method of manufacturing a fiber non-woven fabric composed of polyester and nylon, performing an impregnation process thereon using a polyurethane resin mixture solution, and removing polyester, which is a sea component in the fiber, by a weight reduction process using caustic soda. In addition, the first and second LSR, which are features of the present invention, were coated thereon, thereby manufacturing synthetic leather. Further, in the sea-island type fiber non-woven fabric, in order to have excellent adhesion force with the LSR, the synthetic leather was manufactured so as to have the maximum number of piles in a cross-section of the non-woven fabric and cross-sectional area.

(1). Preparation of Textile

A. Preparation of Non-woven Fabric

A needle-punching non-woven fabric was manufactured so as to have a weight of 150 to 300 g/m$^2$ and a density (density measurement method: weight of the non-woven fabric weight/thickness of the non-woven fabric) of 0.2 to 0.3 g/mm$^2$ using a sea-island type fiber containing polyethylene terephthalate (PET) and nylon at a predetermined ratio and having a fineness of 3.5 denier. Further, in order to increase the density of the yarn in the non-woven fabric, compression was performed using a heat compression roll at 50 to 150° C. so that a thickness of the non-woven fabric manufactured as described above was 0.6 to 1.0 mm. In addition, the elongation of the non-woven fabric may be adjusted by being manufactured using needle punching after inserting a screen textile having a weight of 180 to 230 g/m² into a web at the time of manufacturing the non-woven fabric in order to adjust the elongation of the final product. Further, in consideration of a cost of the product, the non-woven fabric may be manufactured by mixing 0 to 30% of a rayon fiber.

B. Impregnation Process of Non-woven Fabric

An impregnation process was performed on the non-woven fabric manufactured as described above using a polyurethane resin. As the polyurethane resin used herein, a polyurethane resin to which ether type polyol capable of enduring the weight reduction process was applied may be preferably used. That is, in the present invention, in order to use the non-woven fabric as the base material for LSR coating, it is preferable that a cross-sectional area of the yarn of the base material is maximized.

To this end, as the ether type polyurethane resin, it was preferable that a resin containing a solid content of 30% and a viscosity of 100,000 to 150,000 cps/25° C. was diluted with dimethylformamide, which was a solvent, and then used. In addition, 100 parts by weight of the polyurethane resin was diluted with 80 to 150 parts by weight of dimethylformamide, such that sensitive properties of a final product may be finely adjusted.

C. Manufacturing of Sea-island Type Fiber Non-woven Fabric by Elution of Island Component The PET component, which was a sea component of the yarn, was eluted from the polyurethane impregnated non-woven fabric manufactured as described above, and this elution of the sea component was performed by a weight reduction method using caustic soda.

Particularly, in the present invention, the PET component, which was the sea component, was maximally eluted, and nylon yarn part, which was an island component, was maximally separated, such that the cross-sectional area of the yarn as the base material was maximized. To this end, as the elution method, elution was performed using the caustic soda at an amount of 20 to 25 owf based on the weight of the textile at a liquor ratio of 10:1 to 15:1 based on the weight and a processing temperature of 90 to 100° C. for a processing time of 200 to 300 minutes. As a result, the fabric of which the number of piles of the island component was 150 to 250 ea/mm² and the cross-sectional area was 200 to 400 μm² was obtained.

In this case, the number of piles was observed using a scanning electron microscope (magnification of 100 to 300×) with respect to an optional cross-section parallel with a thickness direction of a sample. Then, 30 sea-island type fibers oriented vertically to the observed cross-section were randomly selected and magnified 1000 to 3000 times, such that the number of sea-island type fibers was confirmed, a cross-sectional of the island component was measured, and an average length of the island component was calculated, thereby calculating a cross-sectional area of the yarn base material.

D. Planarization of Sea-island Type Fiber Non-woven Fabric

In order to use the sea-island type non-woven fabric manufactured as described above as the base material for coating, it is important to increase surface smoothness of a coating surface.

To this end, in the present invention, a buffing process was performed using sand paper (100 to 200 mesh) so that a length of the pile on the coating surface was 3 to 15 μm, surface smoothness was secured by heat calendaring at 50 to 150° C. and the yarn density at a surface of the textile was maximally increased.

(2). Release Paper Coating Process (Coating Process of First Coating Solution), Binder Coating Process (Coating Process of Second Coating Solution), Textile Uniting Process and Release Paper Separating Process, and the Like A release paper coating process (coating process of first coating solution), a binder coating process (coating process of second coating solution), a textile uniting process and a release paper separating process, and a selective surface treating process that were the same as those in the method for manufacturing synthetic leather for the interior material of the aircraft or ship in 1 were performed on the non-woven fabric textile manufactured by the above-mentioned method and including nylon micro fibers, which was the island component, on the surface thereof, such that the synthetic leather coated with the silicone rubber and having excellent adhesive force may be obtained.

Meanwhile, according to another embodiment of the present invention, there is provided synthetic leather manufactured by the above-mentioned method for manufacturing synthetic leather to have a structure in which a first coating layer containing the first liquid silicone rubber laminated on a textile by a second coating layer containing the second liquid silicone rubber. That is, the synthetic leather may have a shape in which the second coating layer is positioned between the textile and the first coating layer, and the first coating layer is bonded to the textile by the second coating layer.

This synthetic leather has physical properties suitable for various interior materials according to the kind of used textile base material as described above.

Hereinafter, the present invention will be understood and appreciated more fully from the following embodiments, and the embodiments are for illustrating the present invention and not for limiting the present invention defined by the accompanying claims.

EXAMPLE 1

Manufacturing Synthetic Leather for Interior Material of Aircraft or Ship Using Aramid Fiber, or the Like, as Textile

EXAMPLE 1-1

Manufacturing Synthetic Leather For Interior Material of Aircraft or Ship Using Aramid Fiber and Oxidized Pan Fiber (30:70) in Textile <Textile Weaving and Processing>

70 parts by weight of oxidized pan fiber (OPF) and 30 parts by weight of meta aramid fiber were mixed with each other, and a yarn having a fineness of 170 denier was manufactured by a method of processing a general spun yarn. In addition, a twill weave textile having a warp density of 70, a weft density of 80, and a weight of about 200 g/m² was woven by using the manufactured yarn and applying 2-ply yarn as the warp and a single yarn as the weft. A textile for base material was manufactured through a general scouring process using the textile woven as described above by a method similar to a method of processing a woven textile using a general spun yarn.

<Preparation of Coating Solution>

The S1-1 type and S1-2 type silicone rubber as shown in Table 3 were diluted with each other at a weight ratio of 10:2 to thereby be selected as a silicone rubber for coating, 40 parts by weight of a silicone diluent was applied thereto in consideration of processability in the field, and 20 parts by weight of silicone toner prepared using reactive silicone oil was applied so that a viscosity of a coating solution was in a range of 30,000 to 50,000 cps/25° C. thereby preparing a first coating solution.

In the case of a second coating solution, S2-1 type silicone rubber shown in Table 3 was selected, at most 10 parts by weight of an additional diluent was applied, and 10 parts by weight of silicone toner prepared using reactive silicone oil was applied, thereby preparing a second coating solution in which a viscosity of a coating solution was about 100,000 cps/25 ° C.

<Coating Process and Surface Treating Process>

A coating process was performed using the first and second coating solutions prepared as described above by a dry coating method using a release paper. First, after the prepared first coating solution was primarily coated on the release paper at a coating amount of 150 g/m² and cured and dried in an oven at about 130 to 160° C. the prepared second coating solution was secondarily coated on the dried and cured first coating solution. Thereafter, the manufactured textile was united with the second coating solution in a wet state and cured and dried in an oven at 130 to 160° C. After completely curing and drying the united textile, an interface between the release paper and the first coating solution is separated, thereby manufacturing synthetic leather of which a surface is coated with the LSR. Further, in order to adjust stickiness of the surface, or the like, a silicone surface treating agent prepared by mixing the LSR and an additive with each other was coated at about 20 g/m² so that the surface was not sticky.

EXAMPLE 1-2

Manufacturing Synthetic Leather for Interior Material of Aircraft or Ship Using Aramid Fiber and Oxidized Pan Fiber (50:50) in Textile Synthetic leather was manufactured by the same method in Example 1-1 except for using a spun yarn manufactured by changing a mixing ratio of the yarns applied at the time of weaving the textile so that 50 parts by weight of OPF and 50 parts by weight of meta aramid fiber were mixed with each other.

EXAMPLE 1-3

Manufacturing Synthetic Leather For Interior Material of Aircraft or Ship Using Aramid Fiber, Oxidized Pan Fiber, and Shrinkage Fiber (40:50:10) in Textile Synthetic leather was manufactured by the same method in Example 1-1 except for using a spun yarn manufactured by changing a mixing ratio of the yarns applied at the time of weaving the textile so that 50 parts by weight of OPF, 40 parts by weight of meta aramid fiber, and 10 parts by weight of PET shrinkage fiber were mixed with each other.

COMPARATIVE EXAMPLE 1

The textile used in Example 1-1 was used, but a polyurethane coating solution according to the related art instead of the first and second LSR coating solutions was used, thereby manufacturing synthetic leather.

That is, a release paper was primarily and secondarily coated using the polyurethane coating solution by a processing method generally used at the time of manufacturing dry type polyurethane synthetic leather using the release paper and then united with the textile used in Example 1-1 using a 2-liquid type polyurethane adhesive. As a polyurethane resin used at the time of primary and secondary coating, a polyurethane resin prepared using a polycarbonate type polyol and silicone diol and having a relatively excellent light resistance was used, and as the adhesive resin, a 2-liquid type polyurethane adhesive using polycarbonate polyol was used. In addition, the united textile was aged in an aging chamber at about 70 to 80° C. for 24 hours, and then, the release paper was separated, thereby manufacturing the synthetic leather.

COMPARATIVE EXAMPLE 2

As a textile, the textile used in Example 1-2 was applied, and as a coating method, the polyurethane coating method used in Comparative Example 1 was used, thereby manufacturing synthetic leather.

COMPARATIVE EXAMPLE 3

As a textile, the textile used in Example 1-3 was applied, and as a coating method, the polyurethane coating method used in Comparative Example 1 was used, thereby manufacturing synthetic leather.

COMPARATIVE EXAMPLE 4

As a textile, a textile base material woven by a general knitting method of a knit having a textile density of 48×50 (length×width) using a highly elastic polyester DTY (150 denier, 48 fila) yarn was used, and as a coating method, the same LSR coating method as in Example 1-1 was used, thereby manufacturing synthetic leather.

COMPARATIVE EXAMPLE 5

As a textile, the same knit textile as in Comparative Example 4 was used, and as a coating method, the polyurethane coating method used in Comparative Example 1 was used, thereby manufacturing synthetic leather.

EXPERIMENTAL EXAMPLE 1

Evaluation of Vertical Flame Retardancy, Heat Release Amount, Contamination Resistance, and Smoke Density of Synthetic Leather for Interior Material of Aircraft or Ship Vertical flame retardancy, a heat release amount, contamination resistance, and a smoke density of each of the synthetic leather products manufactured in Examples 1-1, 1-2, and 1-3 and Comparative Examples 1 to 5 were evaluated according to evaluation methods shown in the following Table 4, such that suitability of the synthetic leather product as the interior material of the aircraft or ship was determined.

TABLE 4

| Item | Evaluation method | Evaluation result expression | Remarks |
|---|---|---|---|
| Vertical flame retardancy | FAR Part 25 | Pass, Fail | |
| Heat release amount | OHIO FAR 25.853(d) | Pass, Fail | |
| Contamination resistance | GMW-3402 | Grade | The higher, the better |
| Smoke density | OHIO FAR 25.853(d) | Pass, Fail | |

The results were shown in the following Table 5.

TABLE 5

| | | Properties values of synthetic leather | | | |
|---|---|---|---|---|---|
| Classification | Contents | Vertical flame retardancy | Heat release amount | Contamination resistance | Smoke density |
| Example 1-1 | OPF(7) + m-Aramid(3) + LSR coating | Pass | Pass | 8~10 | Pass |
| Example 1-2 | OPF(5) + m-Aramid(5) + LSR coating | Pass | Pass | 8~10 | Pass |
| Example 1-3 | OPF(5) + m-Aramid(4) + shrinkage fiber (1) + LSR coating | Pass | Pass | 8~10 | Pass |
| Comparative Example 1 | OPF(7) + m-Aramid(3) + PU coating | Fail | Fail | 2~6 | Fail |
| Comparative Example 2 | OPF(5) + m-Aramid(5) + PU coating | Fail | Fail | 2~6 | Fail |
| Comparative Example 3 | OPF(5) + m-Aramid(4) + shrinkage fiber (1) + PU coating | Fail | Fail | 2~6 | Fail |
| Comparative Example 4 | General PET + LSR coating | Fail | Fail | 8~10 | Fail |
| Comparative Example 5 | General PET + PU coating | Fail | Fail | 2~6 | Fail |

As shown in Table 5, it was confirmed that in the synthetic leather in Examples 1-1, 1-2, and 1-3 according to the present invention, the vertical flame retardancy, the heat release amount, the contamination resistance, and the smoke density were excellent, such that the synthetic leather may be suitably used as the interior material of the aircraft or ship. On the contrary, in the case of Comparative Examples 1 to 3 and 5 in which the surface coating layer is coated with polyurethane, even in the case of using the base material having excellent flame retardancy, when physical properties of the coating layer was deteriorated, the synthetic leather did not satisfy the physical properties required in order to be used as the interior material of the aircraft or ship. In addition, as confirmed in Comparative Example 4, even in the case of the LSR coating, when the textile was made of the general PET, the synthetic leather did not satisfy the physical properties required in order to be used as the interior material of the aircraft or ship.

Further, in the synthetic leather according to the present invention in Examples 1-1, 1-2, and 1-3, since the surface coating layer made of the silicone material was formed, effects such as contamination resistance, hydrolysis resistance, solvent resistance, and the like, were additionally obtained. The reason is as follows. A Si—O bond has binding energy larger than that of other bonds, such that the Si—C bond is resistant against heat and oxidation, and a Si—C bond has binding energy smaller than that of a C—C bond, but the Si—C bond is stable due to a difficulty in changing the Si—C bond into Si=C as compared to the C—C bond capable of being decomposed into unstable —CH=CH— by dehydrogenation reaction. Therefore, the synthetic leather including the surface coating layer made of the silicone material as in the present invention has excellent heat resistance and chemical resistance properties, and in the case of products manufactured by the method as described above, application fields of the products may be expanded to the interior material of ship requiring high physical properties as well as the interior material of aircraft.

EXAMPLE 2

Manufacturing Synthetic Leather for Interior Material of Vehicle, Furniture, or Miscellaneous Good Using Polyester Fiber Non-woven Fabric, or the Like, as Textile

EXAMPLE 2-1

Manufacturing Synthetic Leather for Interior Material of a Vehicle, Furniture, or Miscellaneous Good Using Sea-island Type Fiber Non-woven Fabric and Scrim as Textile <Manufacturing Non-woven Fabric>

A non-woven fabric (230 g/m$^2$) was manufactured using a sea-island type fiber non-woven fabric composed of PET fiber having a fineness of 3.5 denier and nylon fiber by a needle punching method, and a PET scrim was inserted thereinto at the time of manufacturing the non-woven fabric, such that shape stability of the product was secured.

<Polyurethane Impregnation and Weight Reduction Process>

An impregnation solution in which 100 parts by weight of a polyurethane resin and 120 parts by weight of dimethylformamide were mixed therein was prepared, and an inner layer portion of the non-woven fabric manufactured above was impregnated with the polyurethane resin by an artificial leather impregnation process. Then, polyester, which was a sea component in the fiber, was removed by a weight reduction method using caustic soda. As the polyurethane resin used in the impregnation process, a polyurethane resin using ether type polyol was used. After the weight reduction process, the number of piles of an island component was 185 ea/mm$^2$ and a cross-sectional area was 304 µm$^2$.

<Surface Polishing>

In order to secure smoothness of a coating surface of the textile for a surface coating agent, the coating surface was polished using a polishing pad having a density of 150 meshes. Therefore, surface smoothness of the coating surface and napping density of the surface were maximally increased. In this case, a length of piles on the surface was 6 to 10 μm.

<Preparation of Coating Solution>

A coating solution was prepared by the same method as in Example 1-1.

<Coating Process and Surface Treating Process>

A coating process and surface treating process was performed by the same method as in Example 1-1.

EXAMPLE 2-2

Manufacturing Synthetic Leather for Interior Material of Vehicle, Furniture, or Miscellaneous Good Using Sea-island Type Fiber Non-woven Fabric as Textile Synthetic leather was manufactured by the same method as in Example 2-1 except for excluding the scrim textile at the time of manufacturing the non-woven fabric in Example 2-1 to thereby increase an elongation of the non-woven fabric.

EXAMPLE 2-3

Manufacturing Synthetic Leather for Interior Material of Vehicle, Furniture, or Miscellaneous Good Using Polyester Knit as Textile Synthetic leather was manufactured by the same method as in Example 2-1 except for using the polyester knit textile in Comparative Example 4 instead of the textile used in Example 2-1.

COMPARATIVE EXAMPLE 6

As a textile, the textile used in Example 2-1 was used, and as a coating method, the polyurethane coating method used in Comparative Example 1 was used, thereby manufacturing synthetic leather.

COMPARATIVE EXAMPLE 7

As a textile, the textile used in Example 2-2 was used, and as a coating method, the polyurethane coating method used in Comparative Example 1 was used, thereby manufacturing synthetic leather.

COMPARATIVE EXAMPLE 8

As a textile, the textile used in Example 2-3 was used, and as a coating method, the polyurethane coating method used in Comparative Example 1 was used, thereby manufacturing synthetic leather.

EXPERIMENTAL EXAMPLE 2

Evaluation of Adhesive Force, Flame Retardancy, Heat Resistance, Light Resistance of Synthetic Leather for Interior Material of Vehicle, Furniture, or Miscellaneous Goods Adhesive force, heat resistance, light resistance of each of the synthetic leather products manufactured in Examples 2-1, 2-2, and 2-3 and Comparative Examples 6 to 8 were evaluated according to evaluation methods shown in the following Table 6, such that suitability of the synthetic leather product as the interior material of vehicle, furniture, or miscellaneous goods was determined.

TABLE 6

| Item | Evaluation method | Evaluation result expression | remarks |
|---|---|---|---|
| Adhesive force (kgf/cm) | NIKE G-44 | Value | — |
| Flame retardancy | FMVSS | Pass, Fail | — |
| Heat resistance | MS 256 | Scale | The higher, the better |
| Light resistance | AATCC 16 200 hrs | Grade | The higher, the better |

The results were shown in the following Table 7.

TABLE 7

| | | Property value of synthetic leather | | | |
|---|---|---|---|---|---|
| Classification | Contents | Adhesive force | Flame retardancy | Heat resistance | Light resistance |
| Example 2-1 | Micro fiber + scrim + LSR coating | 2.0~3.5 | Pass | 4~5 | 4~5 |
| Example 2-2 | Micro fiber + Non-scrim + LSR coating | 2.0~3.5 | Pass | 4~5 | 4~5 |
| Example 2-3 | KNIT + LSR coating | 0.4~1.3 | Pass | 4~5 | 4~5 |
| Comparative Example 6 | Micro fiber + scrim + PU coating | 2.0~3.5 | Fail | 2~3 | 2~3 |
| Comparative Example 7 | Micro fiber + scrim + PU coating | 2.0~3.5 | Fail | 2~3 | 2~3 |
| Comparative Example 8 | KNIT + PU coating | 1.5-2.2 | Fail | 2~3 | 2~3 |

As shown in Table 7, it may be confirmed that in the synthetic leather in Examples 2-1, 2-2, and 2-3 according to the present invention, the adhesive force, the flame retardancy, the heat resistance, the light resistance, and the like, were excellent, such that the synthetic leather was suitable for the interior material of vehicle, furniture or miscellaneous goods.

Further, it was confirmed that in the micro fiber non-woven fabric in Examples 2-1 and 2-2, since the number of piles of the island component was large, an adhesion cross-sectional area with the binder coating layer was further increased, such that the synthetic leather had adhesive force significantly high as compared to the case of using the knit textile as the base material in Example 2-3 simultaneously with having adhesive force similar to that of the synthetic leather processed by polyurethane according to the related art. The reason may be that a specific surface area of the textile to which the silicone coating layer according to the present invention may be adhered was increased.

In addition, the synthetic leather of Examples 2-1, 2-2, and 2-3 had the surface coating layer made of the silicone material, the synthetic leather had excellent flame retardancy, heat resistance, light resistance, contamination resistance, and the like, as compared to the synthetic leather of Comparative Examples 6 to 8 having the surface coating layer made of polyurethane. The reason may be due to chemical properties of the silicone material such as low surface tension, the Si—O bond, and the like. It may be judged that the synthetic leather manufactured as described above may be commercialized as the interior material of furniture or vehicle, or materials for various miscellaneous goods such as a bag, a case, or the like due to excellent physiochemical properties.

Further, the micro fiber type non-woven fabric in Examples 2-1 and 2-2, which was a PET micro fiber non-woven fabric or direct spun yarn type non-woven fabric, has a large cross-sectional area of 170 to 1700 $\mu m^2$, and the leather may have excellent physiochemical properties simultaneously with implementing high adhesive force by coating the surface layer with the LSR to thereby applied to products having various uses.

While the preferred embodiment of the present invention has been shown and described, it will be apparent to those skilled in the art that modifications and variations can be made without departing from the spirit and scope of the invention as defined by the appended claims.

The invention claimed is:
1. A method for manufacturing synthetic leather using different liquid silicone rubber (LSR) coating solutions, the method comprising:
performing primary coating on release paper using a first coating solution containing a first liquid silicone rubber (LSR) having a shore hardness (shore A) of 50 or more and an elongation of less than 300%;
performing secondary coating on the release paper coated with the first coating solution using a second coating solution containing a second liquid silicone rubber (LSR) having a shore hardness (shore A) of less than 50 and an elongation of 300% or more;
uniting the release paper coated with the second coating solution with a textile and drying the united textile; and
separating the release paper from the textile united with the release paper,
wherein the first liquid silicone rubber (LSR) and the second liquid silicone rubber (LSR) comprise a first part and a second part that are mixed with each other,
wherein the first part includes 30~60 wt % of dimethyl-vinyl-terminated dimethyl siloxane, 30~60 wt % of alumina hydrate, less than 10 wt % of trimethylated silica, less than 10 wt % of dimethylvinylated and trimethylated silica, and less than 1% of platinum catalyst,
wherein the second part includes 30~60% of dimethylvinyl-terminated dimethyl siloxane, 30~60% of methyl-hydrogen siloxane, less than 10 wt % of alumina hydrate, less than 10 wt % of trimethylated silica, and less than 1% of dimethylvinylated and trimethylated silica, and
wherein the textile is woven using a spun yarn made of aramid fiber and oxidized pan fiber (OPF).

2. The method of claim 1, further comprising, after the separating of the release paper, surface treating a surface from which the release paper is separated using a silicone surface coating agent.

3. The method of claim 1, wherein the synthetic leather is used as an interior material of an aircraft or a ship.

4. A synthetic leather having a structure in which a first coating layer containing a first liquid silicone rubber (LSR) having a shore hardness (shore A) of 50 or more and an elongation of less than 300% is laminated on a textile by a second coating layer containing a second liquid silicone rubber (LSR) having a shore hardness (shore A) of less than 50 and an elongation of 300% or more,
wherein the first liquid silicone rubber (LSR) and the second liquid silicone rubber (LSR) comprise a first part and a second part that are mixed with each other,
wherein the first part includes 30~60 wt % of dimethyl-vinyl-terminated dimethyl siloxane, 30~60 wt % of alumina hydrate, less than 10 wt % of trimethylated silica, less than 10 wt % of dimethylvinylated and trimethylated silica, and less than 1% of platinum catalyst,
the second part includes 30~60 wt % of dimethylvinyl-terminated dimethyl siloxane, 30~60 wt % of methyl-hydrogen siloxane, less than 10 wt % of alumina hydrate, less than 10 wt % of trimethylated silica, and less than 1% of dimethylvinylated and trimethylated silica, and
wherein the textile is woven using a spun yarn made of aramid fiber and oxidized pan fiber (OPF).

5. The synthetic leather of claim 4, wherein the synthetic leather is used as an interior material of an aircraft or a ship.

* * * * *